United States Patent
Mayni et al.

(10) Patent No.: US 11,292,296 B2
(45) Date of Patent: Apr. 5, 2022

(54) INCLINED STONE EJECTOR FOR IRREGULAR WEAR PROTECTION

(71) Applicant: Compagnie Generale des Etablissements Michelin, Clermont-Ferrand (FR)

(72) Inventors: Paul Andrew Mayni, Magarpatta (IN); Michael Andrews, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 199 days.

(21) Appl. No.: 16/650,064

(22) PCT Filed: Oct. 31, 2017

(86) PCT No.: PCT/US2017/059162
§ 371 (c)(1),
(2) Date: Mar. 24, 2020

(87) PCT Pub. No.: WO2019/088987
PCT Pub. Date: May 9, 2019

(65) Prior Publication Data
US 2020/0231007 A1    Jul. 23, 2020

(51) Int. Cl.
*B60C 11/13* (2006.01)
*B60C 11/03* (2006.01)
(Continued)

(52) U.S. Cl.
CPC .......... *B60C 11/0302* (2013.01); *B60C 11/02* (2013.01); *B60C 11/032* (2013.01);
(Continued)

(58) Field of Classification Search
CPC ................................................ B60C 2011/1361
See application file for complete search history.

(56) References Cited

U.S. PATENT DOCUMENTS

| | | | |
|---|---|---|---|
| 5,160,385 A * | 11/1992 | Goto | B60C 11/0309 152/209.19 |
| 2007/0056665 A1* | 3/2007 | Parmentier | B60C 11/042 152/209.19 |

(Continued)

FOREIGN PATENT DOCUMENTS

| | | |
|---|---|---|
| EP | 2165857 A1 | 3/2010 |
| EP | 2873538 A1 | 5/2015 |
| JP | 2013233834 A | 11/2013 |

OTHER PUBLICATIONS

European Patent Office; International Search Report and Written Opinion for patent application PCT/US2017/059162 filed Oct. 31, 2017; Publisher: European Patent Office, Rijswijk, Netherlands; dated Mar. 6, 2018; pp. 1-11, enclosed.

*Primary Examiner* — Robert C Dye
(74) *Attorney, Agent, or Firm* — Neal P. Pierotti

(57) ABSTRACT

A tread (10) for a heavy truck tire having a groove (14) with a bottom (16) and a stone ejector (18) located within the groove (14) that extends upwards from the groove bottom (16) wherein the stone ejector (18) has a front side (20), a back side (22) and an upper surface (24) that extends at different distances upwards at different locations on the upper surface (24) such that a first location (26) on the upper surface (24) is located closer to the back side (22) and extends a longer distance upwards than a second location (28) on the upper surface (24) that is located closer to the front side (20).

14 Claims, 8 Drawing Sheets

(51) Int. Cl.
*B60C 11/02* (2006.01)
*B60C 11/04* (2006.01)

(52) U.S. Cl.
CPC ........ *B60C 11/0309* (2013.01); *B60C 11/047* (2013.01); *B60C 11/1353* (2013.01); *B60C 2011/0346* (2013.01); *B60C 2011/0348* (2013.01); *B60C 2011/1361* (2013.01); *B60C 2200/06* (2013.01)

(56) References Cited

U.S. PATENT DOCUMENTS

| | | | |
|---|---|---|---|
| 2008/0073012 A1* | 3/2008 | Miyazaki | B60C 11/0311 152/209.19 |
| 2010/0212793 A1* | 8/2010 | Kaji | B60C 11/047 152/209.18 |
| 2017/0028790 A1 | 2/2017 | Shmagranoff et al. | |

* cited by examiner

INCLINED STONE EJECTOR FOR IRREGULAR WEAR PROTECTION

CROSS-REFERENCE TO RELATED APPLICATIONS

The present application is a 35 U.S.C. § 371 application of PCT/US17/59162 filed on Oct. 31, 2017 and entitled "Inclined Stone Ejector for Irregular Wear Protection." PCT/US17/59162 is incorporated by reference herein in its entirety for all purposes.

FIELD OF THE INVENTION

The subject matter of the present invention relates to a tire with a sculpture feature for the reduction of abnormal tread wear. More particularly, the present application involves a tire with a stone ejector that has a sloped upper surface that provides a coupling force that reduces irregular tread wear.

BACKGROUND OF THE INVENTION

Manufacturers of heavy commercial vehicle tires have made progress in developing tire architectures and tire materials that increase the wear resistance of tire treads and reduce the rolling resistance of tires while at the same time improving their level of grip and resistance to road hazards. Irregular tread wear (also called "uneven wear" or "abnormal wear") is a great concern for heavy commercial vehicle tires as it can progressively induce tire vibrations that become sensed by the driver through the steering wheel. It can also make for a poor looking wear pattern. Both of these undesired effects often lead to the tire being removed from service at an early stage of its wear life. Generally, the more the tire is put through a slow-wearing usage, the more irregular wear is affecting the removal mileage. This is why resistance to irregular wear is of paramount importance for truck tires in the so-called long haul steer usage.

It is known to include structural features in tires to fight irregular wear. For example, a sacrificial rib can be incorporated into the tread architecture to delay the onset of irregular wear. However, this feature is sensitive to curbing aggression and its use may not be practical outside of North American long haul applications. Other sculptural features that can combat irregular wear include microsipes and inclined microsipes. These are small grooves that extend generally in the lateral, width direction of the tire. Unfortunately, these features are unusable in severe usage applications due to aggression concerns. Aggression on tires is a concern in growing or emerging markets that feature roadways that subject the tire to more severe usage that functions to tear up and wear down the tread at a higher rate than roads that are smoother and in better condition.

Stone ejectors are sculptural features of tires that are located in grooves of the tread that function to remove stones from the grooves and prevent stones from drilling into the belts and carcass of the tire. The stone ejectors are blocks of rubber at the bottom of the grooves and generally do not extend all the way to the upper surface of the tread, at least not when the tire is new. The stone ejectors work by flexing or compressing in and out of the contact patch as the tire rotates in order to push stones present within the groove out of the groove. However, stone ejectors do not function to decrease abnormal wear in tires. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
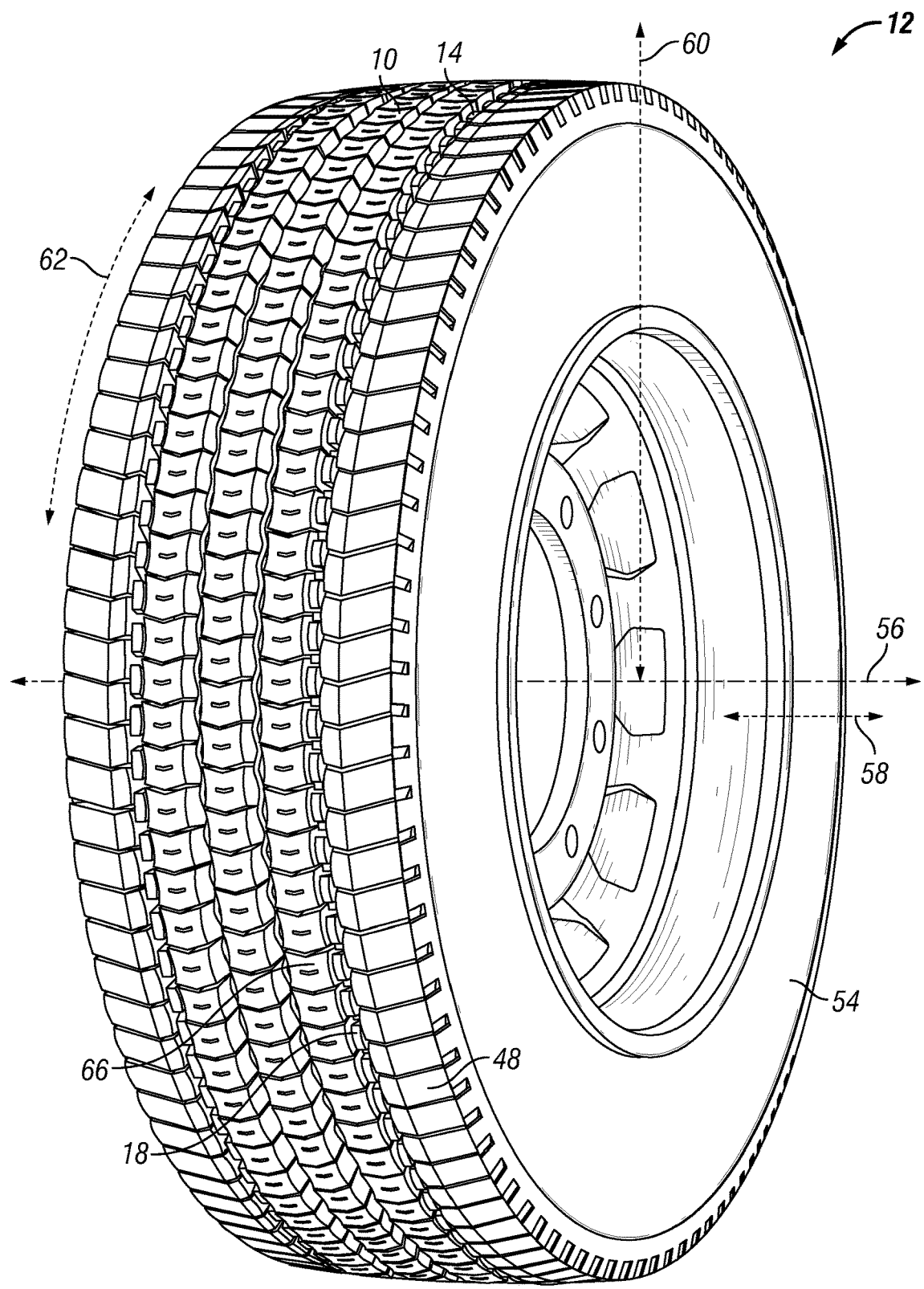
FIG. 1 is a perspective view of a heavy truck tire in accordance with one exemplary embodiment.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an inclined stone ejector 18 that provides a coupling force that reduces or eliminates irregular wear. This coupling force is produced by including an inclined upper surface 24 on the stone ejector 18 that is oriented in the direction of rotation of the tire 12. As the tire 12 enters the contact patch, the stone ejector 18 creates a coupling force x/z that mimics forces generated by other, less robust sculptural features such as sacrificial ribs, micro sipes, and inclined micro sipes. In this regard, x is the forward/rolling component, and z is the vertical component of force. Although described as having an inclined upper surface 24, the upper surface 24 in some arrangements need not be inclined, or continuously inclined, but need only have a portion closer to its back edge 32 that is higher, thicker than a portion closer to its front edge 30.

FIG. 1 shows a tire 12 that is a heavy duty truck tire 12. In this regard, the tire 12 is not designed for nor used with a car, motorcycle, or light truck (payload capacity less than 4,000 pounds), but is instead designed for and used with heavy duty trucks such as 18 wheelers, garbage trucks, or box trucks. The tire 12 may be a steer tire, a drive tire, a trailer tire, or an all position tire. The tire 12 includes a carcass 54 onto which a tread 10 is disposed thereon. The central axis 56 of the tire 12 extends through the center of the carcass 54, and the axial direction 58 of the tire 12 is parallel to the central axis 56. The axial direction 58 can also be referred to and known as the inboard/outboard direction 58. The radial direction 60 of the tire 12 is perpendicular to the central axis 56, and the tread 10 is located farther from the central axis 56 in the radial direction 60 than the carcass 54. The tread 10 extends all the way around the carcass 54 in the circumferential direction 62 of the tire 12 and circles the central axis 56 360 degrees.

The tread 10 features five ribs that are separated by four longitudinal grooves that extend in the circumferential direction 62. The ribs and grooves may extend completely around the tire 12 in the circumferential direction 62. The five ribs can be classified as a central rib, two intermediate ribs, and two shoulder ribs. In FIG. 1, only one of the intermediate ribs 66 is labeled, and this intermediate rib 66 is located next to the only labeled shoulder rib 48. A longitudinal groove 14 separates the intermediate rib 66 from the shoulder rib 48. The shoulder rib 48 may be a sacrificial rib in some embodiments. Although five ribs and four grooves are shown in the illustrated embodiment, any number of ribs can be present in other exemplary embodiments. The ribs can each be made up of a number of tread blocks that can have various shapes, sizes, and configurations. The inclusion of these architectural features gives the tread 10 different performance properties in use. The tread 10 may include certain structural features that can reduce abnormal wear. One such structural feature shown with reference to FIG. 1 may be directional sipes that extend across the tread blocks of the ribs in the axial direction 58.

Stone ejectors 18 are located in the groove 14 between the intermediate rib 66 and the shoulder rib 48. The stone ejectors 18 extend along the entire length of the groove 14 in the circumferential direction 62 and thus extend 360 degrees around the central axis 56. The stone ejectors 18 are spaced from one another in the circumferential direction 62 and are likewise spaced from the ribs 48, 66 in the axial direction 58. However, in other arrangements, the stone ejectors 18 may engage adjacent stone ejectors 18, the intermediate rib 66, and/or the shoulder rib 48. The tire 10 also includes another groove located adjacent the other shoulder rib and stone ejectors 18 are likewise present within this other groove. The grooves between the center rib and the intermediate ribs do not include stone ejectors 18. However, in other embodiments they may be present within these grooves as well.

Figure 2:
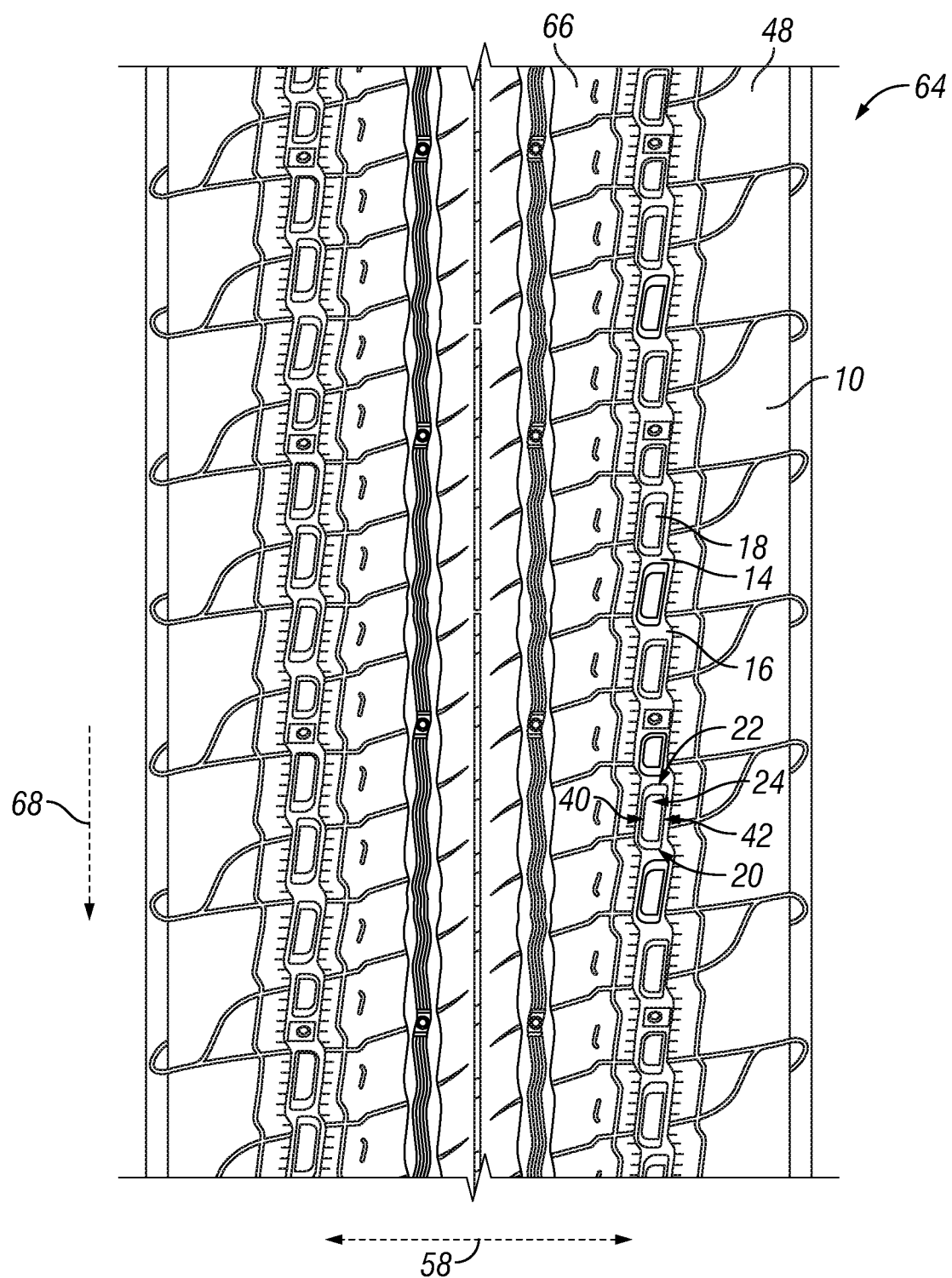
FIG. 2 is a top plan view of a retread band in accordance with one exemplary embodiment.

Although described in connection with a tire 12, the tread 10 having the stone ejectors 18 may alternatively be provided as a retread band 64 that may be subsequently attached to a carcass 54 through a retread process. An example of a retread band 64 is illustrated in FIG. 2 that has five ribs and four grooves that span across the tread 10 in the axial direction 58 which is the inboard/outboard direction 58 of the tread 10. Stone ejectors 18 are located in the grooves between the shoulder ribs and the intermediate ribs. One of the intermediate ribs 66 is labeled and it along with the adjacent labeled shoulder rib 48 partially defines the labeled groove 14. The labeled groove 14 is further defined at its bottom by the tread 10 and is open at its top. The retread band 64 is directional in that it has a specified rolling direction 68 in which at least the stone ejectors 18 are oriented. There may or may not be other directional features on the tread 10 that likewise cause the retread band 64 to be directional above and beyond just the stone ejectors 18.

The stone ejectors 18 are arranged so that their front sides 20 are oriented towards the direction of the rolling direction 68, and so that their oppositely disposed back sides 22 are oriented away from the rolling direction 68. The stone ejectors 18 have an outboard side 42 that directly faces the shoulder rib 48, and an inboard side 40 that directly faces the intermediate rib 66. The upper surface 24 of the stone ejectors 18 are visible and are inclined relative to the bottom 16 of the grooves 14, although this cannot be easily distinguished in FIG. 2. The stone ejectors 18 are spaced from the shoulder rib 48 and the intermediate rib 66 and are free from contact with both of these ribs 48, 66. In other arrangements, the stone ejector 18 may engage the intermediate rib 66 and/or the shoulder rib 48. The shoulder rib 48 may be a sacrificial rib in certain embodiments. Further, although shown as being between the intermediate ribs and the shoulder ribs, the stone ejectors 18 could likewise or alternatively be within any other groove or grooves of the tread 10, such as the grooves formed between the center rib and the adjacent intermediate ribs. The retread band 64 with the tread 10 may be of any length and width and can be crafted for tires 12 of varying sizes.

Figure 3:
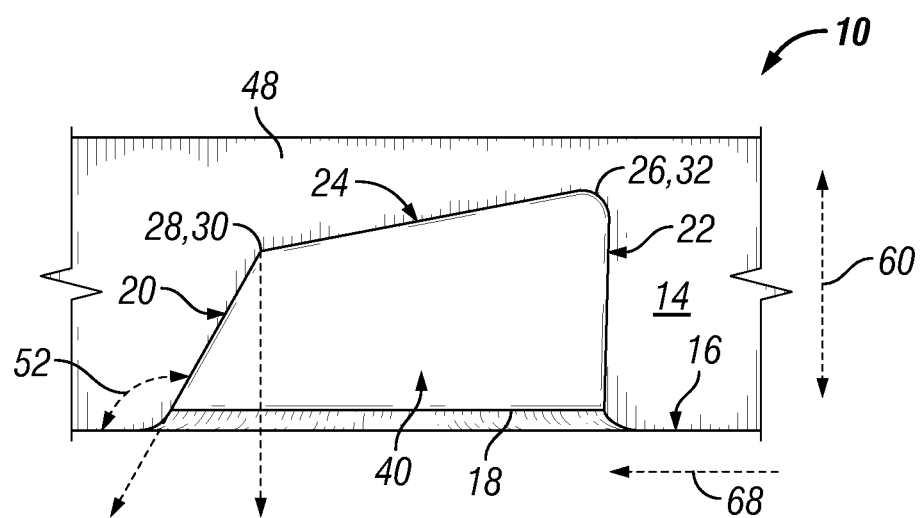
FIG. 3 is side view of a stone ejector and tread in accordance with one exemplary embodiment.
Figure 4:
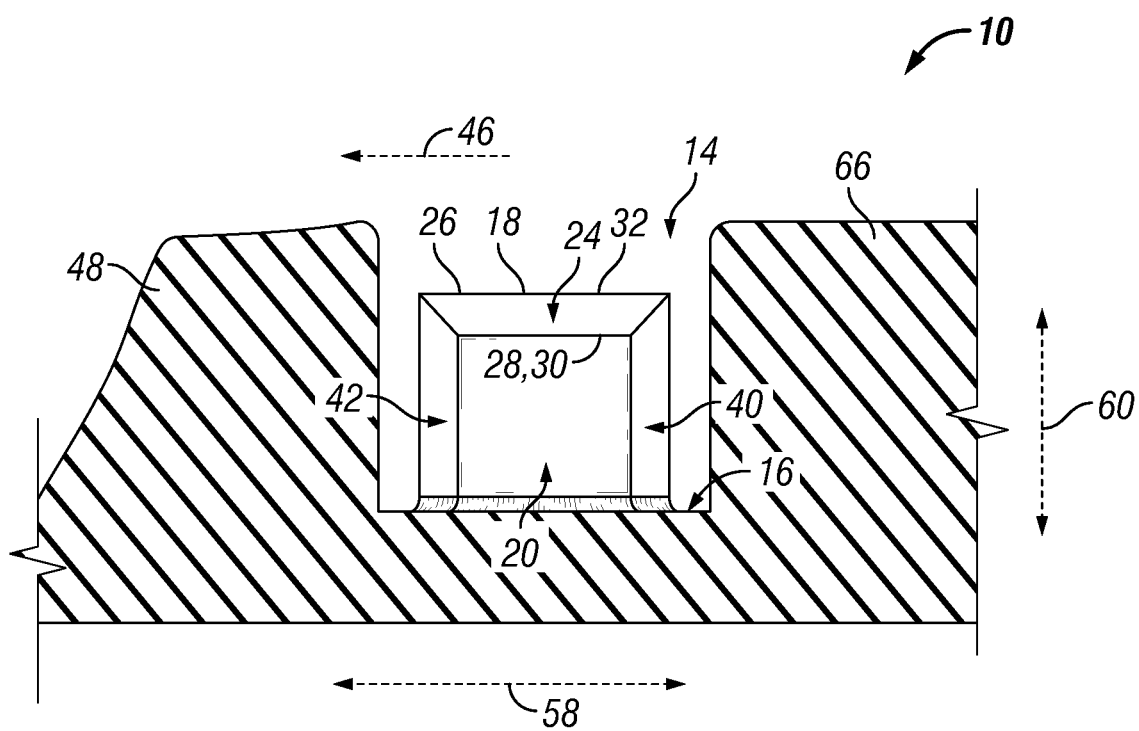
FIG. 4 is a front view of the stone ejector and tread of FIG. 3.
Figure 5:
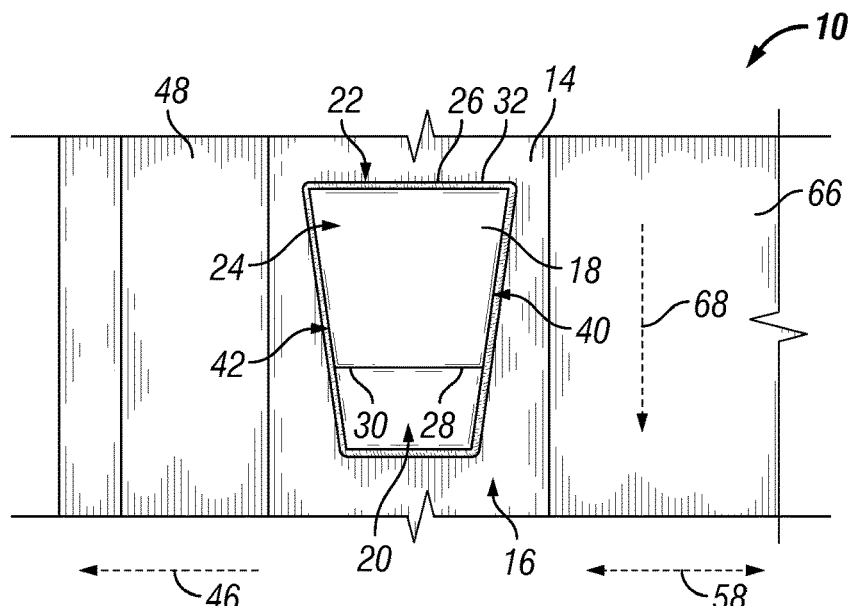
FIG. 5 is a top plan view of the stone ejector and tread of FIG. 3.

FIGS. 3-5 illustrate a stone ejector 18 in accordance with one exemplary embodiment that features an inclined upper surface 24. As shown in FIG. 3, the stone ejector 18 extends upwards from the bottom 16 of the groove 14. The tread 10 is new tread and the stone ejector 18 extends upwards in the radial direction 60 to a point that is below the extension of the shoulder rib 48 in the radial direction 60. When the tire 12 rotates, the stone ejector 18 will not engage the ground 70 as it is below the upper surfaces of the shoulder ribs 48 and intermediate ribs 66. The stone ejector 18 in such instances will not impact the problem of abnormal wear. Once the tread 10 begins to wear down the upper surfaces of the intermediate rib 66 and the shoulder rib 48 will erode in the radial direction 60 and the upper surface 24 of the stone ejector 18 will contact the ground 70 and will begin to impact and reduce the problem of abnormal wear.

The base of the stone ejector 18 has fillets that join the bottom 16 of the groove 14 formed by the tread 10. The fillets need not be present in other embodiments. The stone ejector 18 has a front side 20 that is angled relative to the radial direction 60. The front side 20 extends at an angle 52 to the radial direction 60 such that the front side 20 extends from the bottom 16 to the upper surface 24 at an angle 52. Angle 52 is an obtuse angle and may be various degrees in different versions of the stone ejector 18. For example, angle 52 can be from 110-120 degrees, from 120-130 degrees, from 130-140 degrees, from 140-150 degrees, or up to 160 degrees in accordance with different exemplary embodiments. In other embodiments, the angle 52 may be 102 degrees. Although described as being an obtuse angle 52, in other versions of the stone ejector 18, angle 52 can be an acute angle or a right angle. The front side 20 is a flat surface. The stone ejector 18 has a back surface 22 that is likewise flat and that extends outward in the radial direction 60 from the bottom 16. The back surface 22 is oriented at a ninety degree angle to the bottom 16. The rolling direction 68 is illustrated in FIG. 3 and is the direction the tire 12 rotates. In this regard, the front side 20 is before the back side 22 such that the front side 20 will enter the contact patch before the back side 22 when the tire 12 rotates.

The upper surface 24 of the stone ejector 18 extends at different distances from the bottom 16 in the radial direction 60. In particular, a first location 26 on the upper surface 24 is located closer to the back side 22 than a second location 28 on the upper surface. In turn, the second location 28 is located closer to the front side 20 than the first location 26 is to the front side 20. The first location 26 is located farther from the bottom 16 in the radial direction 60 than the second location 28. In this regard, the upper surface 24 at the first location 26 is farther from the bottom 16 than is the upper surface 24 at the second location 28. The front edge 30 of the upper surface 24 engages the front side 20, and the back edge 32 of the upper surface 24 engages the back side 22. The first location 26 is located at the back edge 32, and the second location 28 is located at the front edge 30. However, in other arrangements, the first and second locations 26, 28 need not be at the front and back edges 30, 32. The upper surface 24 is continuously inclined from the front edge 30 to the back edge 32 so that at all points closer to the back edge 32 are farther from the bottom 16 in the radial direction 60 than points closer to the front edge 30. The first location 26 at the back edge 32 may be 1 millimeter farther from the bottom 16 in the radial direction 60 than the second location 28 at the back edge 32 is to the bottom 16 in the radial direction 60.

In other versions, the upper surface 24 need not be continuously inclined all the way from the front edge 30 to the back edge 32, but could have some portions located closer to the back side 22 closer to the bottom 16 in the radial direction 60 than portions closer to the front side 20. However, the upper surface 24 will still have somewhere a first location 26 closer to the back side 22, and a second location 28 closer to the front side 20, where the distance in the radial direction 60 from the bottom 16 to the upper surface 24 is longer to the first location 26 than to the second location 28. The upper surface 24 when inclined can be any amount of inclination, so long as it is greater than zero degrees and not a flat surface parallel to the bottom 16.

Figure 6:
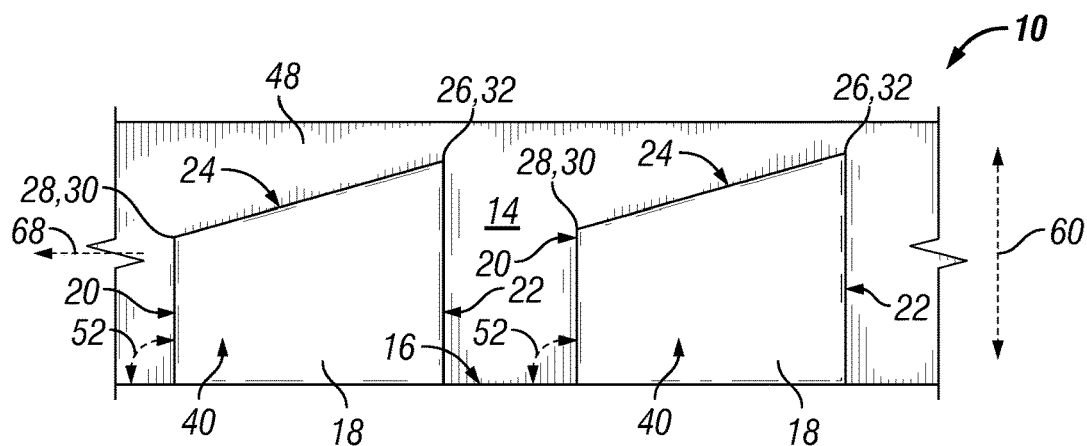
FIG. 6 is a side view of a pair of stone ejectors.
Figure 7:
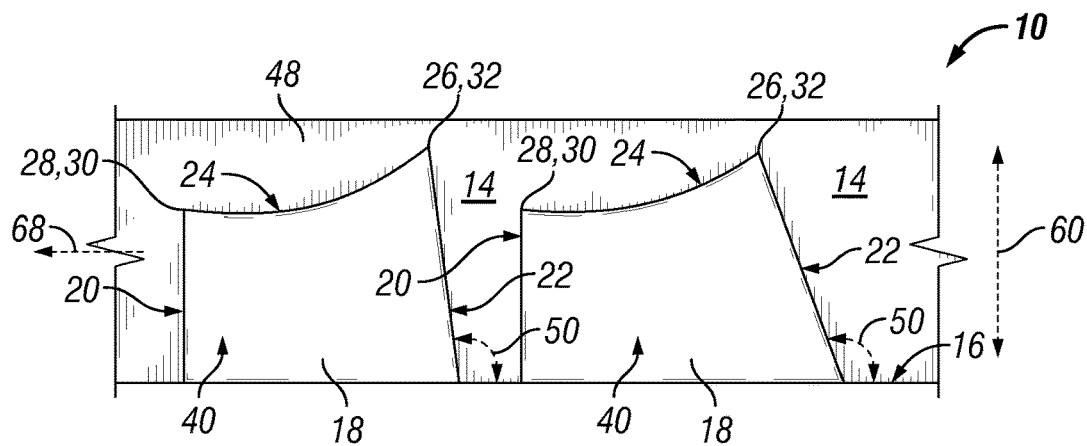
FIG. 7 is a side view of a pair of stone ejectors with concave upper surfaces and angled back sides.

It is to be understood that the drawings in FIGS. 3, 6 and 7 show the bottom 16 being flat. The tread 10 could be a retread and thus in fact have a flat bottom 16. Alternatively, the tread 10 can be in a tire 12 which is a round object. The bottom 16 may be curved as well, and the stone ejector 18 can also exhibit some amount of curvature due to the roundness of the tire 12. However, the figures illustrate the bottom 16 and the stone ejectors 18 being flat without this curvature for sake of clarity in the description.

With reference now to FIGS. 4 and 5, the stone ejector 18 has an inboard side 40 that directly faces the intermediate rib 66, and an outboard side 42 that directly faces the shoulder rib 48. The direct facing means that no other component is located between the two facing components. The inboard side 40 is a flat surface and is inclined in the axial direction 58. Similarly, the outboard side 42 is also a flat surface inclined in the axial direction 58 an identical magnitude as the inboard side 40. The outboard side 42 is free from engagement with the shoulder rib 48, and the inboard side 40 is free from engagement with the intermediate rib 66. The back side 22 extends a longer distance in the axial direction 58 than does the front side 20 so that the back side 22 is wider than the front side 20. In this regard, the inboard side 40 extends in the inboard direction upon its extension from the front side 20 to the back side 22. The outboard side 42 extends in the outboard direction 46 upon its extension from the front side 20 to the back side 22. Although shown as being symmetrical relative to the front and back sides 20, 22, the inboard and outboard sides 40, 42 may be asymmetrical in other embodiments. It is to be understood that FIGS. 3-5 show only a single one of the stone ejectors 18, and only portions of the intermediate rib 66 and the shoulder rib 48 and that the tread 10 can include multiple ones of the stone ejectors 18 and other sections of the tread 10. Other figures in the drawings likewise only disclose portions of the tread 10 and not all of the tread 10.

FIG. 6 is a side view of a pair of sequential stone ejectors 18 of the tread 10. They are both shaped and sized the same as one another and have front sides 20 and back sides 22 that extend outwards in the radial direction 60 at ninety degree angles to the bottom 16. The upper surfaces 24 are both organized so that they are continuously inclined with first locations 26 at the back edges 32 farther from the bottom 16 than second locations 28 located at the front edges 30. The stone ejectors 18 are spaced from one another along the bottom 16 so that they do not contact one another, and directly face one another. The upper surfaces 24 of all of the stone ejectors 18 of the entire tire 12 can all be arranged with higher first locations 26 than second locations 28.

FIG. 7 shows a pair of sequential stone ejectors 18 arranged in the same manner as one another. The upper surface 24 of the stone ejector 18 has a concave shape that extends all the way from the front edge 30 to the back edge 32. The first location 26 is located at the back edge 32 and extends a farther distance in the radial direction 60 from the bottom 16 than does the second location 28 located at the front edge 30. The upper surface 24 could be convex in other arrangements of the stone ejector 18. The back side 22 is angled relative to the bottom 16 so that it does not extend at a ninety degree angle to the bottom 16. Here, the back side 22 is oriented at an angle 50 to the bottom 16 and is an obtuse angle such that the back side 22 extends from the back edge 32 to the bottom 16 in a direction away from the rolling direction 68. Angle 50 may be from 91-100 degrees, from 100-110 degrees, from 110-120 degrees, from 130-140 degrees, or up to 150 degrees in accordance with various exemplary embodiments. As can be seen the two stone ejectors 18 in FIG. 7 have angles 50 that are of different magnitudes so that the back sides 22 are oriented at different inclinations to the bottom 16. However, the angles 50 could be the same in other arrangements so that all of the stone ejectors 18 are identical to one another.

Figure 8:
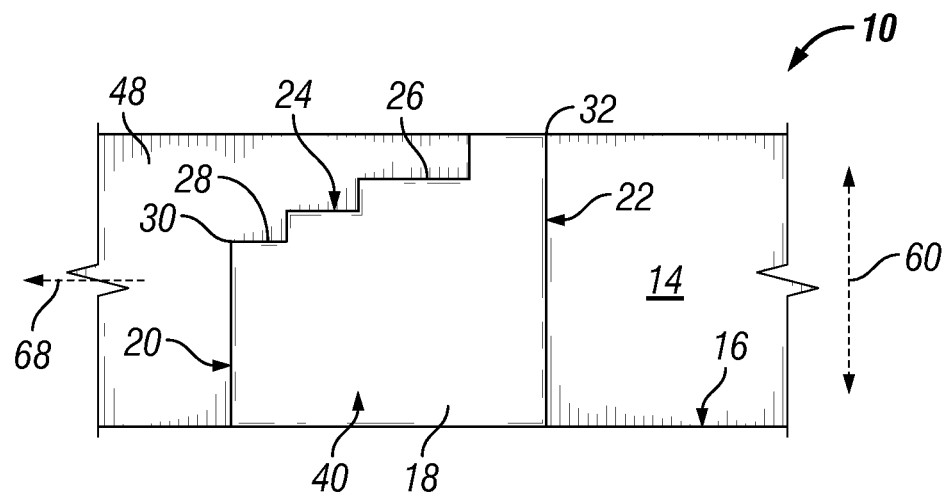
FIG. 8 is a side view of a stone ejector that has a stepped upper surface.

FIG. 8 shows another embodiment of the stone ejector 18 that again has a front side 20 and a back side 22 that extend ninety degrees to the bottom 16. The upper surface 24 has a first location 26 that is closer to the back side 22 than a second location 28. The second location 28 is closer to the front side 20 than the first location 26. The upper surface 24 at the first location 26 extends a farther distance from the bottom 16 in the radial direction 60 than does the upper surface 24 at the second location 28. The first location 26 is spaced from the back edge 32 in the rolling direction 68 and is not located at the back edge 32. Likewise, the second location 28 is spaced from the front edge 30 in the rolling direction 68 and is not located at the front edge 30. It is to be understood that the first and second locations 26, 28 need not be located at the front and back edges 30, 32. The upper surface 24 is stepped in that it is arranged as a series of four steps from the front edge 30 to the back edge 32. In other embodiments, any number of steps may be used such as two steps, three steps, from 5-10 steps, or up to 20 steps. The steps extend different distances from the bottom 16 in the radial direction 60. The steps are arranged so that they continuously increase in distance from the bottom 16 in the radial direction 60 upon extension from the front edge 30 to the back edge 32.

The upper surface 24 can be arranged in various embodiments so that it does not move closer towards the bottom 16 in the radial direction 60 at any point or points upon extension from the front edge 30 to the back edge 32. Although the upper surface 24 may have the same distance from the bottom 16 in the radial direction 60 at different locations in the rolling direction 68, for instance all of the points on the upper surface 24 at a single step are at different locations in the rolling direction 68 but are all the same distance in the radial direction 60, nowhere does the upper surface 24 move closer to the bottom 18 upon extension of the upper surface 24 from the front side 20 to the back side 22. In other embodiments of the stone ejector 18, the upper surface 24 may in fact move closer to the bottom 18 at certain points in the direction of extension from the front edge 30 to the back edge 32. The stone ejector 18 is arranged so that its upper surface 24 has a portion that extends to the upper surface of the shoulder rib 48 in the radial direction 60 so that they are located at the same distance in the radial direction 60. The stone ejector 18 may therefore engage the ground 70 along with the shoulder rib 48 when the tire 12 is new. However, other embodiments show the upper surface 24 even at its highest point still lower than the upper surface of the shoulder rib 48 in the radial direction 60 and this distance may be up to 2 millimeters, or greater than 2 millimeters in accordance with different exemplary embodiments.

Figure 9:
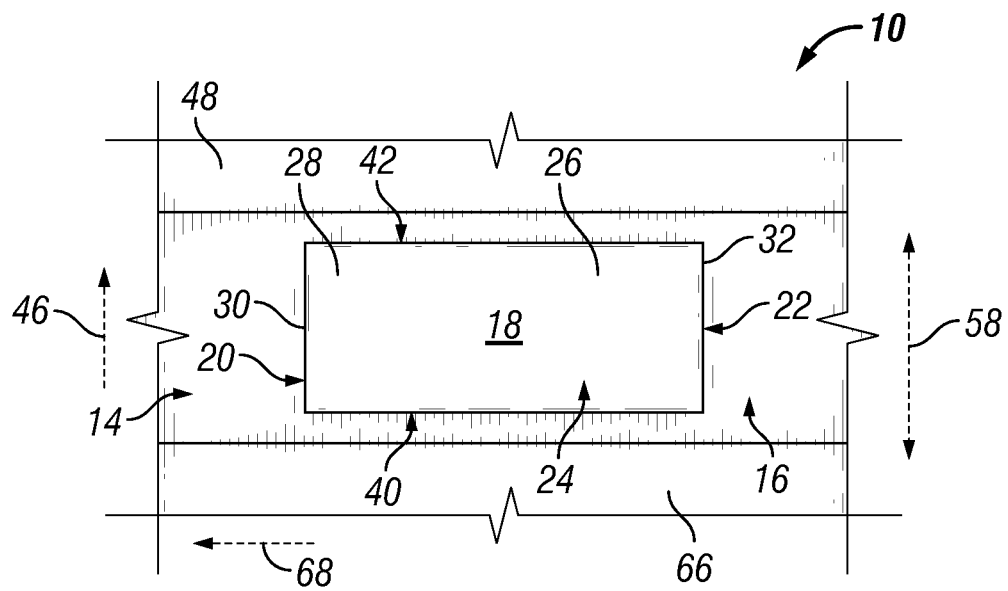
FIG. 9 is a top plan view of a stone ejector with sides parallel to the adjacent ribs.

The stone ejector 18 in FIG. 9 has a flat front side 20 and a flat back side 22 that extend upwards in the radial direction 60 at ninety degree angles to the bottom 16. The upper surface 24 is inclined and flat along its entire length from the front edge 30 to the back edge 32. The front side 20 and the back side 22 extend the same width as one another in the axial direction 58. The inboard side 40 is flat and is parallel to the side of the intermediate rib 66 that partially defines the groove 14. The outboard side 42 is flat and is parallel to the side of the shoulder rib 48 that defines the groove 14. The inboard and outboard sides 40, 42 are parallel with one another and are of the same lengths as one another in the rolling direction 68.

Figure 10:
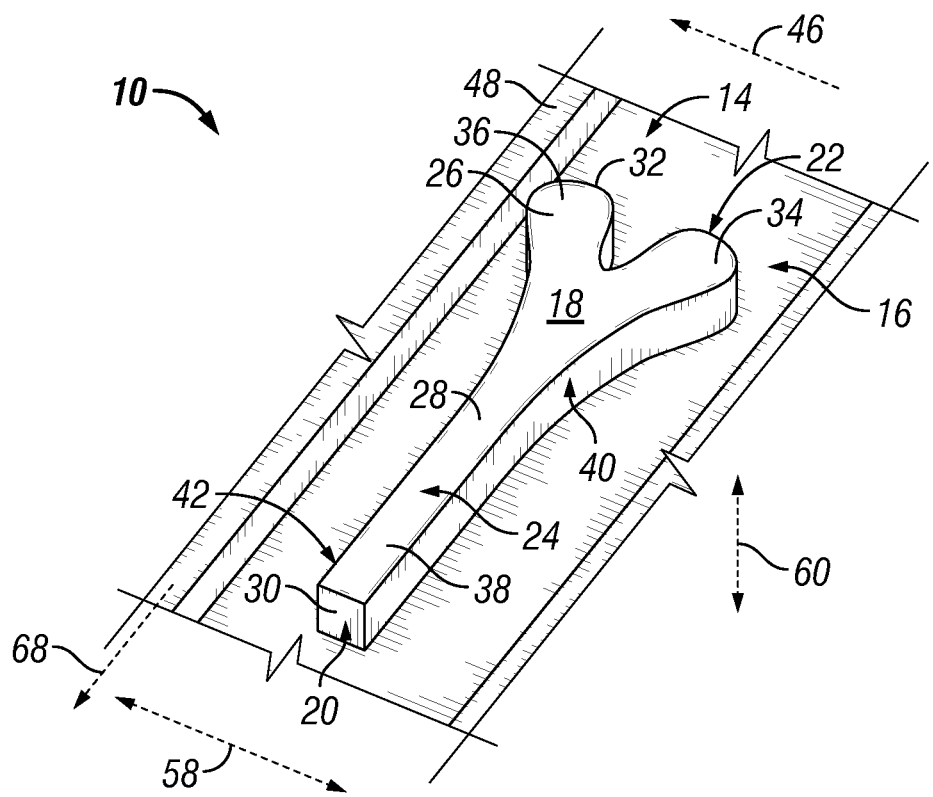
FIG. 10 is a perspective view of a stone ejector that is Y-shaped.
Figure 11:
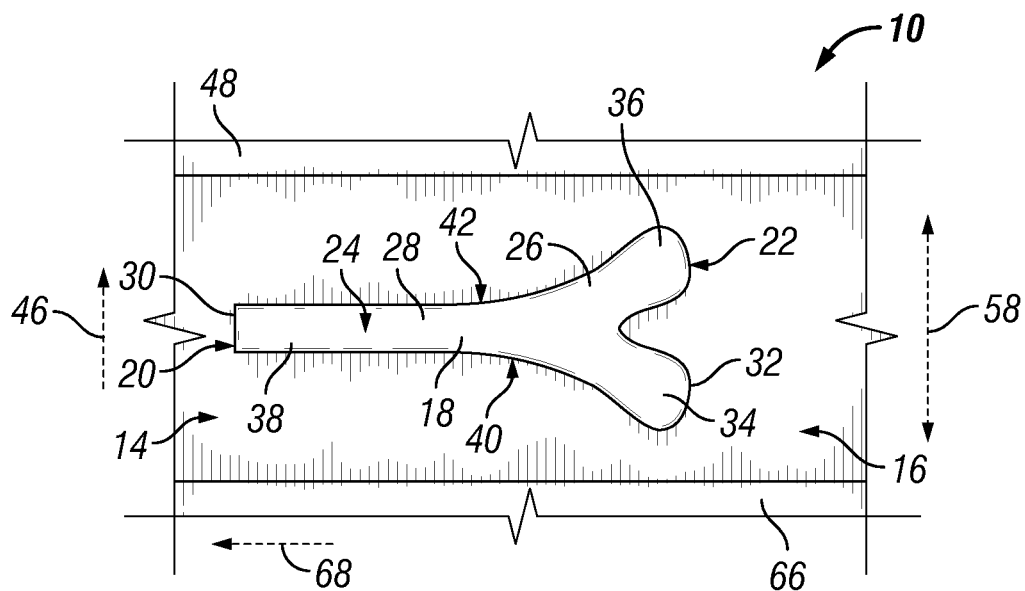
FIG. 11 is a top plan view of the stone ejector of FIG. 10.
Figure 12:
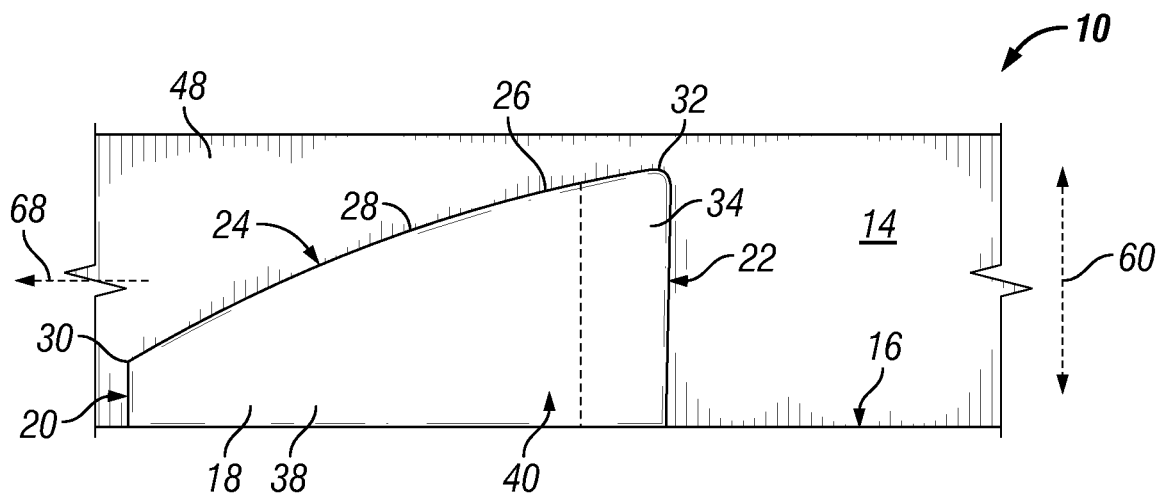
FIG. 12 is a side view of the stone ejector of FIG. 10.

FIGS. 10-12 show another exemplary embodiment of the stone ejector 18 that protects against abnormal tread 10 wear. The stone ejector 18 has a Y-shaped configuration with the wider portion located rearward in the rolling direction 68 and the more narrow portion located forward in the rolling direction 68. The stone ejector 18 is spaced from the shoulder rib 48 and the intermediate rib 66 and is not in engagement therewith. The stone ejector 18 has an inboard prong 34 that defines a portion of the back edge 32, and an outboard prong 36 that defines a different portion of the back edge 32. The outboard prong 36 is outboard from the inboard prong 34 in the outboard direction 46 of the tire 12. The inboard and outboard prongs 34, 36 may be shaped and sized identical to one another and a void can be located between them at the centerline of the stone ejector 18. The forward portion of the stone ejector 18 features a single prong 38 that is located at the midpoint of the stone ejector 18 in the axial direction 58. The stone ejector 18 reaches its most narrow point in the axial direction 58 at the single prong 38, and the front edge 30 is located at the single prong 38. With reference in particular to FIG. 12, the upper surface 24 is convex in shape continuously from the front edge 30 to the back edge 32. The first location 26 is farther from the bottom 16 in the radial direction 60 than the second location 28, and the locations 26, 28 are spaced from the edges 30, 32. The upper surface 24 continuously increases from the front edge 30 to the back edge 32 in the radial direction 60. This increase may be at the same rate, or at a different rate, but at no point in its extension rearward in the rolling direction 68 does the upper surface 24 move towards the bottom 16 in the radial direction 60. The inboard side 40 and the outboard side 42 have concave shapes. At the inboard and outboard prongs 34, 36 the sides 40 and 42 transition to convex shapes. In other embodiments of the stone ejector 18, the inboard and outboard sides 40, 42 are concave along their entire lengths from the front side 20 to the back side 22.

The embodiment of the stone ejector 18 in FIGS. 10-12 is Y-shaped, and this is but one example of the various shapes the stone ejector 18 can take. In other arrangements, the stone ejector 18 can be X-shaped, circular in shape, triangular in shape, or can be variously shaped. It is to be understood that the shapes of the stone ejectors 18 illustrated and described in the present application are only examples and that others are possible in accordance with other exemplary embodiments of the tread 10.

Figure 13:
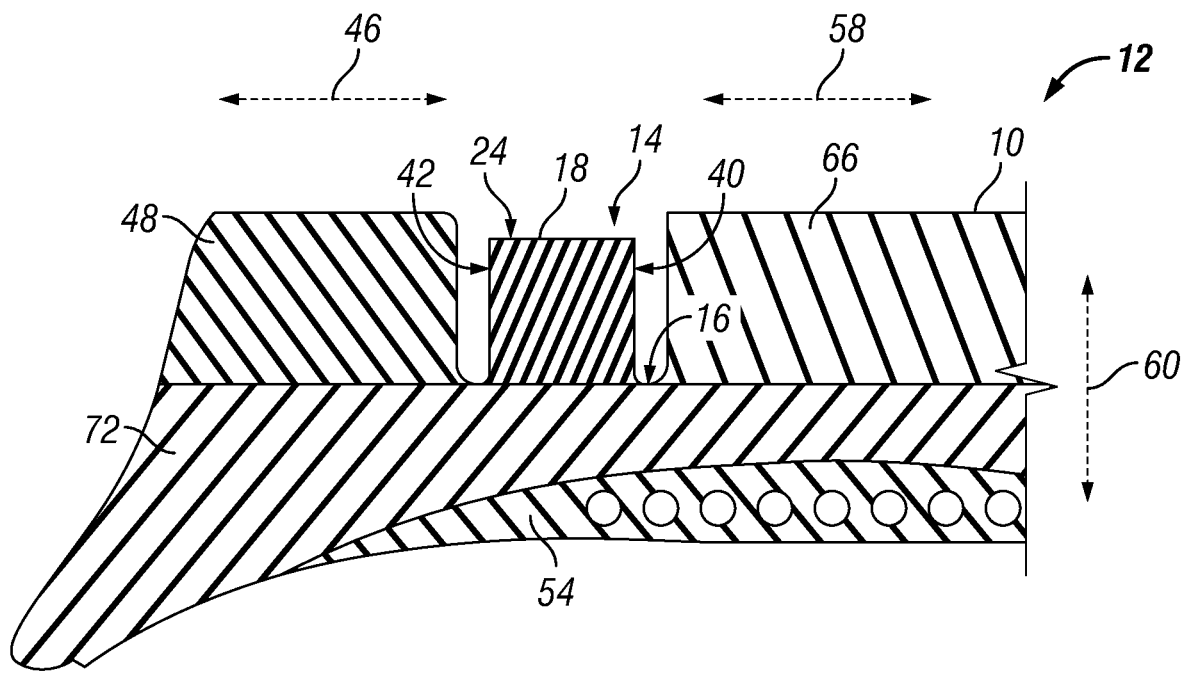
FIG. 13 is a cross-section view of a portion of the tread and carcass made of material having different hysteresis values.

With reference now to FIG. 13, a cross-section view of portions of a tread 10 and carcass 54 are shown that illustrate another exemplary embodiment of the tire 12. The stone ejector 18 is made up of a material that is different than the material making up an undertread layer 72 of the tire 12. The carcass 54 is below this undertread layer 72 and includes belts and may be made of a different material than the undertread layer 72 and the stone ejector 18. The stone ejector 18 is made of a different material than the shoulder rib 48, and is made of a different material than the intermediate rib 66. In some instances, the intermediate rib 66 and the shoulder rib 48 can be made of the same material as one another. The stone ejector 18 has a different hysteresis value than the ribs 48, 66 and a different hysteresis value than the undertread layer 72. In particular, the stone ejector 118 has a higher hysteresis value than the shoulder rib 48, the intermediate rib 66, and the undertread layer 72.

Hysteresis can be measured by the tan($\delta$) value of the rubber making up the layer/component. The loss factor "tan($\delta$)" is a dynamic property of the rubber compound. It is measured on a viscosity analyzer (Metravib VA4000) according to Standard ASTM D5992-96. The response of a test specimen consisting of two cylindrical pellets each 2 millimeters thick and one centimeter in diameter is recorded (the test specimen is made from samples taken from a tire mid-way up the height of the layer concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers amplitude of deformation from 0.1% to 25% peak to peak (on the outbound cycle) then from 25% to 1% peak to peak (on the return cycle). The results that are used here are the loss factor tan($\delta$) and the complex dynamic shear modulus. The complex dynamic shear modulus is denoted "G*25" in reference to the 25% strain applied during the test. During the outbound cycle, the maximum value of tan $\delta$ that is observed is denoted "max tan($\delta$)".

In some embodiments, the max tan($\delta$) of the shoulder rib 48 and the intermediate rib 66 may be from 0.06-0.15, and the max tan($\delta$) of the stone ejector 18 may be from 0.12-0.27, in which the max tan($\delta$) of the stone ejector 18 is higher than the max tan($\delta$) of the ribs 48, 66. In certain embodiments the max tan($\delta$) of the undertread layer 72 is from 0.06-0.15 and the max tan($\delta$) of the stone ejector 18 is higher than the undertread layer and is greater than 0.15 and less than 0.27. In certain embodiments, the max tan($\delta$) of the undertread layer 72 is the same as the max tan(S) of the ribs 66, 48, and this max tan($\delta$) is less than the max tan($\delta$) of the stone ejector 18. The max tan($\delta$) of the stone ejector 18 can be the same as, greater than, or less than the max tan($\delta$) of the undertread layer 72, the shoulder rib 48, the intermediate rib 66, carcass 54, or any other portion of the tire 10, and the material making up the stone ejector 18 may be the same as or different from the material making up the undertread layer 72, shoulder rib 48, intermediate rib 66, carcass 54 or any other portion of the tire 12. The max tan(δ) of the stone ejector 18 may be any value in accordance with various exemplary embodiments. The undertread layer 72 may have the same max tan(δ) as the ribs 66, 48 in certain embodiments.

The complex shear modulus for 25% strain (G*25) at 60° C., referred to herein as G*25, may be selected so that the G*25 of the stone ejector 18 is greater than the G*25 of the intermediate rib 66 and the G*25 of the shoulder rib 48. The G*25 of the stone ejector 18 can be greater than the G*25 of the undertread layer 72. In this regard, the G*25 can be used to gauge the rigidity of the material, and the stone ejector 18 may be selected so that it is more rigid than the shoulder rib 48, the undertread layer 72, and the intermediate rib 66. In other embodiments, the G*25 of the stone ejector 18 may be the same as that of the shoulder rib 48, the undertread layer 72, or the intermediate rib 66. In some embodiments, the G*25 of the stone ejector 18, the undertread layer 72, the intermediate rib 66, and the shoulder rib 48 are from 1.5-1.8 MPa, with the stone ejector 18 being the highest or tied for the highest among these components. The G*25 of the stone ejector 18 may be any number in other exemplary embodiments.

The stone ejector 18 may be provided with a high G*25 and thus a greater rigidity than other tread 10 components because a more rigid stone ejector 18 may generate greater x/z coupling and function to better reduce abnormal wear. The higher G*25 with the stone ejector 18 may also provide a better wear speed differential so that the stone ejector 18 wears slower than the rest of the useful tread 10 such as the shoulder rib 48 and the intermediate rib 66. Although described as having a greater max tan(δ) and G*25, it is to be understood that one or both of these values of the stone ejector 18 may be the same as or less than those of the other components of the tire 12 such as the shoulder rib 48, the intermediate rib 66, the undertread layer 72, and the carcass 54.

The length, width, and height of the stone ejector 18 can be varied in order to achieve different performance properties. Also, the degree of slope of the upper surface 24 can be varied to again achieve different performance characteristics of the stone ejector 18. The material that changes hysteresis and/or G*25 of the stone ejector 18 versus other components of the tread 10 can be present in order to enhance these effects, or may not be present in accordance with different exemplary embodiments. The upper surface 24 having the different elevations generates forces in the contact patch of the tire 12 to fight irregular wear, and the presence of the stone ejector 18 still maintains the original intent of stone ejectors in preventing stone damage to the tire 12. Since the orientation of the upper surface 24 allows for the minimization of abnormal wear, the tire 12 that has the stone ejectors 18 of the present disclosure are all directional tires 12. The G*25 of the stone ejector 18 can be the same as, greater than, or less than the G*25 of the undertread layer 72, the shoulder rib 48, the intermediate rib 66, the carcass 54, or any other portion of the tire 10. The G*25 of the undertread layer 72 may be the same as the G*25 of the shoulder rib 48 and the intermediate rib 66 in certain exemplary embodiments. The material making up the stone ejector 18 may be the same as or different from the material making up the shoulder rib 48, intermediate rib 66, undertread layer 72, carcass 54, or any other portion of the tire 12.

Figure 14:
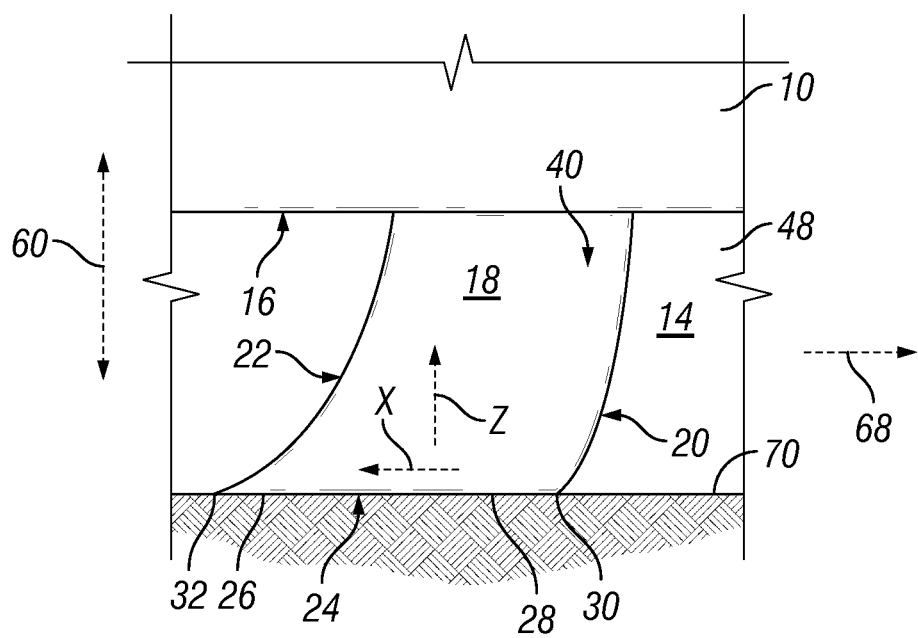
FIG. 14 is a side view of the stone ejector engaging the ground.

The heel to toe aspect of the upper surface 24 generates a coupling force that in turn results in better irregular wear resistance. The stone ejector 18 engaging the ground 70 is illustrated with reference to FIG. 14 that shows the stone ejector 18 deformed in the contact patch and the entire upper surface 24 engaging the ground 70. The rolling direction 68 is the direction the entire tire 12 is moving, but it is to be understood that different parts of the tire 12 move in different directions when rolling. For example, the stone ejector 18 illustrated in FIG. 14 is in fact moving in a direction opposite to the rolling direction 68 due to it being on the bottom of the tire 12 contacting the ground 70. The front side 20 and the back side 20 are curved in shape upon engaging the ground 70 and being subjected to driving and weight forces. The orientation of the upper surface 24 as previously discussed presents a generally inclined surface to the ground 70 resulting in x and z force components to be generated on the stone ejector 18. The driving force is applied to the adjacent shoulder rib 48 and this applied driving force to this rib 48 results in a decrease in abnormal wear of the shoulder rib 48. The stone ejector 18 could be used to prolong the coupling effect that currently degrades linearly with tread 10 wear. The tire 12 may initially get its directionality from other structural features such as micro sipes, and may remain protected even when these structural features have lost their effectiveness from tread 10 wear as the stone ejectors 18 can begin to contribute to abnormal wear minimization or elimination. The stone ejectors 18 protect against aggression by preventing stones from drilling into the tread 10, and the upper surface 24 orientation protects from irregular wear.

The tire 12 with the tread 10 having the stone ejector 18 can be an original equipment manufactured tire that is produced and goes onto a new vehicle. The tire 12 may also be a retreaded tire in which a used carcass 54 is fitted with a new tread 10 that includes the stone ejector 18.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A tread for a heavy truck tire, comprising:
   a groove that has a bottom;
   a stone ejector located within the groove that extends upwards from the groove bottom, wherein the stone ejector has a front side and a back side, wherein the stone ejector has an upper surface that extends at different distances upwards at different locations on the upper surface such that a first location on the upper surface is located closer to the back side than to the front side and extends a longer distance upwards than a second location on the upper surface that is located closer to the front side than to the back side;
   wherein the stone ejector has an inboard side and an outboard side, wherein the back side is wider than the front side, wherein the outboard side is flat and sloped such that the outboard side extends in an outboard direction upon extending from the front side to the back side, and wherein the inboard side is flat and sloped such that the inboard side extends in an inboard direction upon extending from the front side to the back side; and
   a successive stone ejector immediately successive to the stone ejector in a circumferential direction with a space present between the stone ejector and the successive stone ejector, wherein the successive stone ejector is shaped the same as the stone ejector and has a successive stone ejector back side that extends a longer distance upwards than a successive stone ejector front side such that the successive stone ejector is oriented the same as the stone ejector in the circumferential direction.

2. The tread as set forth in claim 1, wherein the second location is located at a front edge of the upper surface that borders the front side, wherein the first location is located at a back edge of the upper surface that borders the back side, wherein the upper surface slopes continuously from the front edge to the back edge.

3. The tread as set forth in claim 1, wherein the second location is located at a front edge of the upper surface that borders the front side, wherein the first location is located at a back edge of the upper surface that borders the back side, wherein the upper surface is a series of steps that extend at different distances upwards.

4. The tread as set forth in claim 1, wherein the tread has a shoulder rib that partially defines the groove into which the stone ejector is located, wherein the tread has a plurality of the stone ejectors located in the groove that extend along an entire length of the groove, wherein the plurality of stone ejectors each have upper surfaces that extend at different distances upwards at different locations on each of the upper surfaces of the plurality of stone ejectors, wherein the plurality of stone ejectors are all spaced from one another in the circumferential direction and are all sized and shaped the same as one another and all are oriented the same as one another in the circumferential direction.

5. The tread as set forth in claim 1, wherein the upper surface has a back edge that borders the back side, wherein the back side extends at a ninety degree angle from the bottom of the groove to the back edge.

6. The tread as set forth in claim 1, wherein the upper surface has a back edge that borders the back side, wherein the back side extends at an obtuse angle from the bottom of the groove to the back edge.

7. The tread as set forth in claim 1, wherein the upper surface has a front edge that borders the front side, wherein the front side extends at an obtuse angle from the bottom of the groove to the front edge.

8. The tread as set forth in claim 1, wherein the tread is attached to a carcass and is a component of a tire.

9. The tread as set forth in claim 1, wherein the tread is a retread band.

10. The tread as set forth in claim 1, wherein the tread is configured for being used with a directional tire.

11. A tread for a heavy truck tire, comprising:
a groove that has a bottom;
a stone ejector located within the groove that extends upwards from the groove bottom, wherein the stone ejector has a front side and a back side, wherein the stone ejector has an upper surface that extends at different distances upwards at different locations on the upper surface such that a first location on the upper surface is located closer to the back side than to the front side and extends a longer distance upwards than a second location on the upper surface that is located closer to the front side than to the back side; and
a successive stone ejector immediately successive to the stone ejector in a circumferential direction with a space present between the stone ejector and the successive stone ejector, wherein the successive stone ejector is shaped the same as the stone ejector and has a successive stone ejector back side that extends a longer distance upwards than a successive stone ejector front side such that the successive stone ejector is oriented the same as the stone ejector in the circumferential direction;
wherein the second location is located at a front edge of the upper surface that borders the front side, wherein the first location is located at a back edge of the upper surface that borders the back side, wherein the upper surface is concave in shape from the front edge to the back edge.

12. A tread for a heavy truck tire, comprising:
a groove that has a bottom;
a stone ejector located within the groove that extends upwards from the groove bottom, wherein the stone ejector has a front side and a back side, wherein the stone ejector has an upper surface that extends at different distances upwards at different locations on the upper surface such that a first location on the upper surface is located closer to the back side than to the front side and extends a longer distance upwards than a second location on the upper surface that is located closer to the front side than to the back side; and
a successive stone ejector immediately successive to the stone ejector in a circumferential direction with a space present between the stone ejector and the successive stone ejector, wherein the successive stone ejector is shaped the same as the stone ejector and has a successive stone ejector back side that extends a longer distance upwards than a successive stone ejector front side such that the successive stone ejector is oriented the same as the stone ejector in the circumferential direction;
wherein the upper surface has a Y shape such that the upper surface has an inboard prong proximate the back side and an outboard prong proximate the back side and a single prong proximate the front side.

13. A tread for a heavy truck tire, comprising:
a groove that has a bottom;
a stone ejector located within the groove that extends upwards from the groove bottom, wherein the stone ejector has a front side and a back side, wherein the stone ejector has an upper surface that extends at different distances upwards at different locations on the upper surface such that a first location on the upper surface is located closer to the back side than to the front side and extends a longer distance upwards than a second location on the upper surface that is located closer to the front side than to the back side; and
a successive stone ejector immediately successive to the stone ejector in a circumferential direction with a space present between the stone ejector and the successive stone ejector, wherein the successive stone ejector is shaped the same as the stone ejector and has a successive stone ejector back side that extends a longer distance upwards than a successive stone ejector front side such that the successive stone ejector is oriented the same as the stone ejector in the circumferential direction;
wherein the stone ejector has an inboard side and an outboard side, wherein the inboard side has a concave shape and wherein the outboard side has a concave shape, wherein the back side is wider than the front side.

14. A tread for a heavy truck tire, comprising:
a groove that has a bottom;
a stone ejector located within the groove that extends upwards from the groove bottom, wherein the stone ejector has a front side and a back side, wherein the stone ejector has an upper surface that extends at different distances upwards at different locations on the upper surface such that a first location on the upper surface is located closer to the back side than to the front side and extends a longer distance upwards than a second location on the upper surface that is located closer to the front side than to the back side; and a successive stone ejector immediately successive to the stone ejector in a circumferential direction with a space present between the stone ejector and the successive stone ejector, wherein the successive stone ejector is shaped the same as the stone ejector and has a successive stone ejector back side that extends a longer distance upwards than a successive stone ejector front side such that the successive stone ejector is oriented the same as the stone ejector in the circumferential direction;

wherein the stone ejector is more rigid than other portions of the tread that directly face the stone ejector both inboard and outboard of the stone ejector such that the stone ejector has a higher G*25 than the G*25 of the other portions of the tread that directly face the stone ejector both inboard and outboard of the stone ejector.

* * * * *